C. A. IMLAY.
PEDAL PROPELLED VEHICLE.
APPLICATION FILED SEPT. 22, 1916.
1,249,407.
Patented Dec. 11, 1917.
2 SHEETS—SHEET 1.
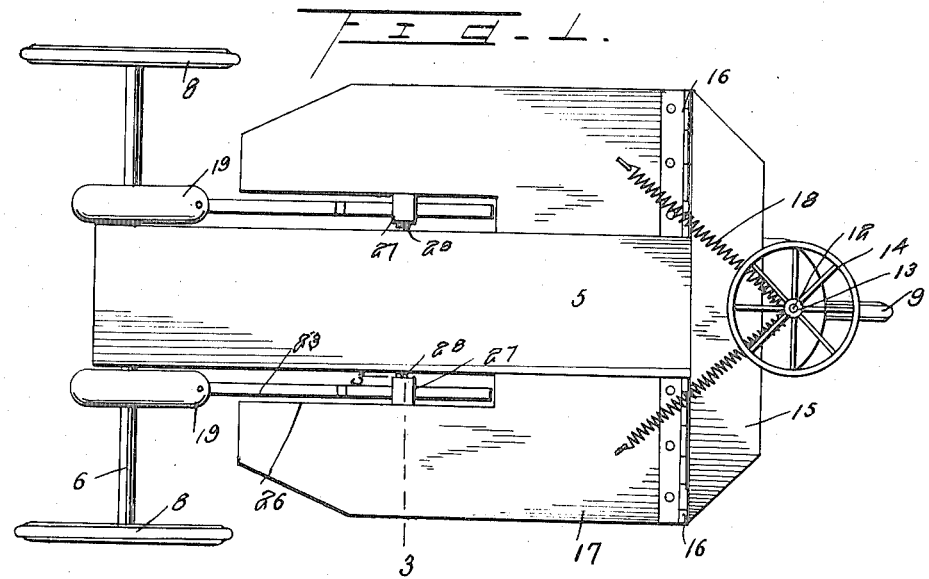
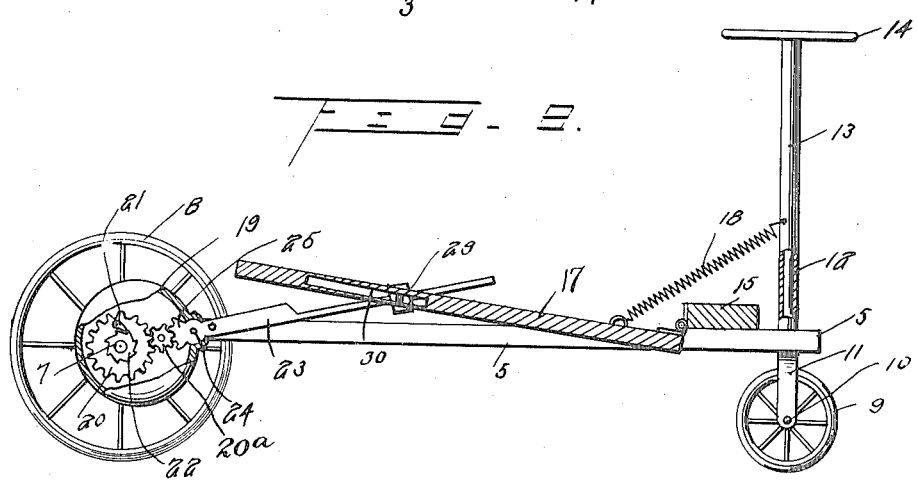
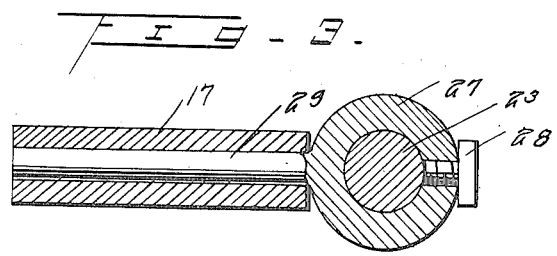
Inventor
C. A. Imlay

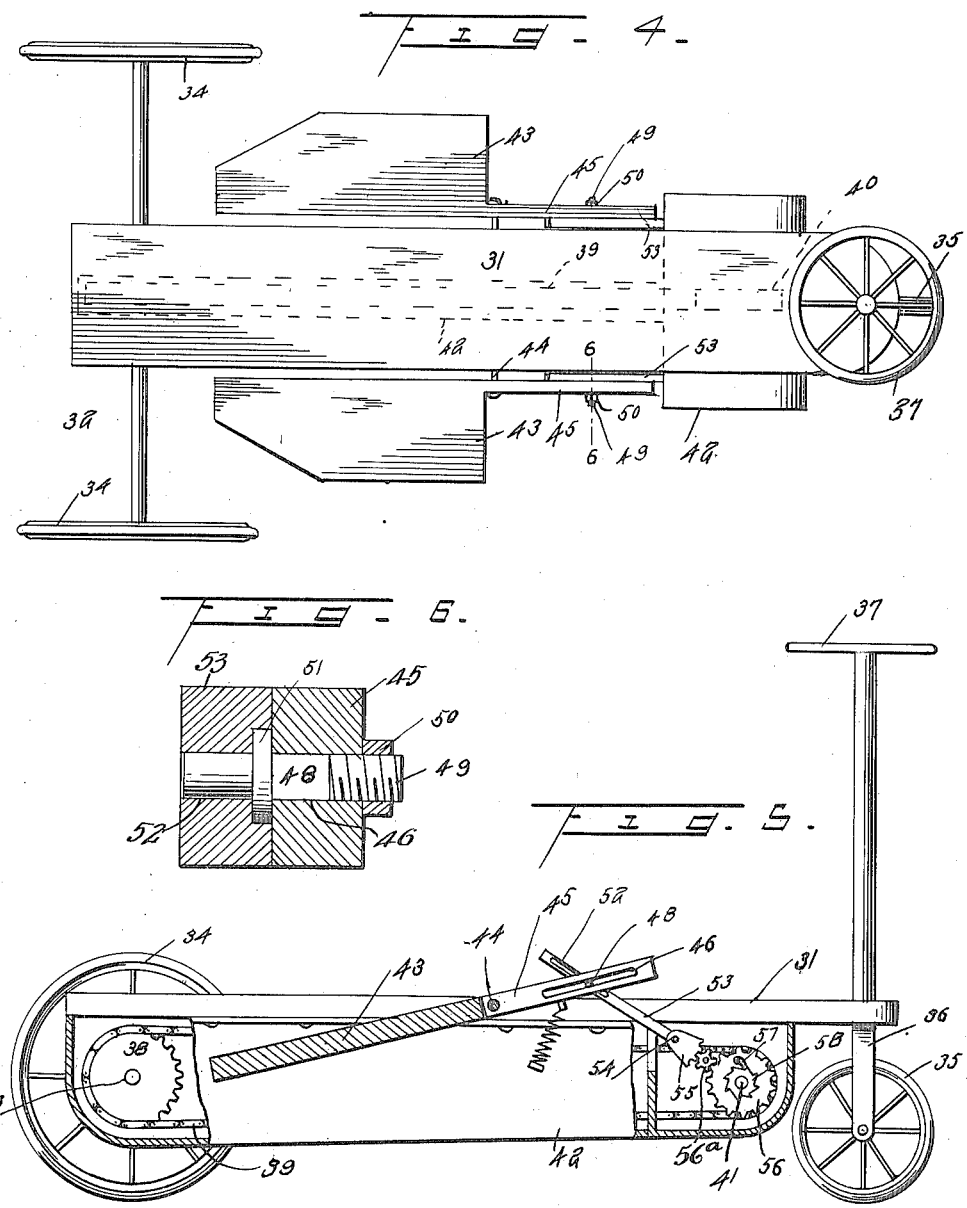

UNITED STATES PATENT OFFICE.

CLIFFORD A. IMLAY, OF SAN FRANCISCO, CALIFORNIA.

PEDAL-PROPELLED VEHICLE.

1,249,407.  Specification of Letters Patent.  Patented Dec. 11, 1917.

Application filed September 22, 1916. Serial No. 121,593.

*To all whom it may concern:*

Be it known that I, CLIFFORD A. IMLAY, a citizen of the United States, residing at San Francisco, in the county of San Francisco and State of California, have invented certain new and useful Improvements in Pedal-Propelled Vehicles; and I do hereby declare the following to be a full, clear, and exact description of the invention, such as will enable others skilled in the art to which it appertains to make and use the same.

This invention has for its object to provide an improved pedal propelled vehicle, which may be easily steered and rapidly operated by the occupant who assumes a standing position.

Another object is the provision of means for transmitting the power from the pedals to the rear axle of the vehicle, and including means adapted for adjustment to permit the operator to easily ascend steep grades.

With these and other objects in view, the invention consists in the novel construction, combination and arrangement of parts as will be hereinafter specifically described, claimed and illustrated in the accompanying drawings, in which:

Figure 1 represents a top plan view of the pedal operated vehicle, Fig. 2 represents a side elevation thereof, partly in section, Fig. 3 represents a detail sectional view on the line 3—3 of Fig. 1, Fig. 4 represents a plan view of a modified type of the pedal propelled vehicle, Fig. 5 represents a side elevation thereof, partly in section, and Fig. 6 represents a transverse sectional view on the line 6—6 of Fig. 4.
Referring to the drawings in detail, wherein similar reference numerals designate corresponding parts throughout the several views, the numeral 5 indicates a platform, which is secured at its rear end to the rear axle housing 6, in which is rotatably supported the rear axle 7, carrying the rear wheels 8, which are arranged upon opposite sides of the platform 5. The front end of the platform 5 is supported upon a steering wheel 9, which is rotatably mounted upon a shaft 10 secured in the lower bifurcated terminal 11 of the steering post 12, which extends upwardly through the platform 5 and through the steering post housing 13 secured to the platform. A steering wheel 14 is secured in the upper terminal of the steering post 12 and is designed to be operated to steer the vehicle.

A cross bar 15 is secured adjacent the forward extremity of the platform 5 and is pivotally connected by hinges 16 with a pair of pedals 17, which extend rearwardly and terminate in spaced relation to the rear axle housing 6. The pedals 17 are normally retained in elevated position by the tension of springs 18.

Gear housings 19 are connected with the axle housing 16 on opposite sides of the rear terminal of the platform 5 and house the pinions 20, which are rotatably mounted upon the axle 7 and are locked for rotation in one direction therewith by the pawls 21, pivotally secured to the pinions 20 and the ratchet wheels 22 rigidly secured to the axle 7.

A lever 23 is pivotally secured at 24 to each longitudinal edge of the platform 5, and extends rearwardly into the adjacent gear housing 19. The rear terminal of the lever is connected with a gear segment 25, which meshes with the pinion 20 and projects forwardly from its pivotal axis between the platform 5 and the pedal 17, being received within a recess 26 formed in the inner edge of the latter.

Sleeves 27 are slidably mounted upon the reduced forward terminals of the levers 23 and are rigidly fastened in adjusted position thereon by set screws 28. Laterally projecting pins 29 are formed integral with the sleeves 27 and are slidably received in elongated slots 30 formed adjacent the rear terminals of the pedals 17.

In operation, the occupant alternately treads upon the two pedals 17, which are normally retained in elevated position by the tension of springs 18, the downward movement of each pedal being transmitted to the co-acting pinion 20 carried by the rear axle 7 through the pin 29, lever 23, and gear segment 25. The pawls 21 co-act with the ratchet wheels 22, during rotary movement of the pinions 20, to drive the axle 7ª in a direction to propel the vehicle forwardly, and during the return or upward movement of the pedals, under the influence of the springs 18, the pawls 21 ride idly over the teeth of the ratchet wheels 22. By adjusting the sleeves 27 longitudinally of the levers 23, the leverage exerted by the pedals 17 may be varied, as desired, in order to permit the occupant of the vehicle to ascend comparatively steep grades with a minimum exertion of power.

Referring to the modification of the invention illustrated in Figs. 4 and 6, the numeral 31 indicates a platform which is secured adjacent its rear end to an axle housing 32, in which is rotatably supported an axle 33 carrying the rear or drive wheels 34. The front end of the platform is supported upon a steering wheel 35, which is journaled in the bifurcated lower terminal of the steering post carrying the steering wheel 37.

A single sprocket wheel 38 is non-rotatably secured upon the rear axle 33 and supports a sprocket chain 39, which extends forwardly under the platform 31 and is trained over a sprocket wheel 40 non-rotatably secured upon a shaft 41.

The shaft 41 is supported in a housing 42, which is secured under the platform 31 and constitutes a housing for the sprocket wheel 38, chain 39, shaft 41 and parts associated therewith.

A pair of pedals 43 are pivotally secured at 44 to the longitudinal edges of the platform 31 and are provided with reduced forward ends 45 formed with longitudinally elongated slots 46, receiving the pins 47. The medial portion of each pin 47, which is disposed within the slot 46, is squared, as indicated at 48, so as to secure the pin against rotary movement in the slot and the outer terminal of the pin is formed with external screw threads 49 upon which is fitted a nut 50, adapted to draw the integral flange 51, carried by the pin, into frictional engagement with the inner surface of the reduced terminal 45 of the pedal and thus rigidly secure the pin in adjusted position longitudinally of the pedal extension.

The inner terminals of the pins are slidably mounted in slots 52 formed in a pair of levers 53, which are pivotally secured at 54 to the housing 42, and are adapted to be oscillated by the pedals 43, during operation of the latter. By adjusting the pins 47 longitudinally of the pedals, the leverage exerted by the pedals upon the levers may be varied, as desired, in order to permit the operator of the vehicle to more easily propel the vehicle upon hills.

The forward terminals of the levers 53 are connected with gear segments 55, which mesh with pinions 56 rotatably mounted upon the shaft 41 on opposite sides of the sprocket wheel 40. The pinions 56 are locked for rotation with the shaft 41 to drive the gear wheels 34 forwardly by pawls 57, pivotally secured to the pinions 56 and ratchet wheels 58, rigidly secured to the shaft 41.

What I claim is:

1. A pedal operated vehicle including a platform, a steering wheel supporting the forward extremity of said platform, driving wheels supporting the rear end of said platform, a pair of levers pivotally supported by the platform, means for transmitting power from said levers to said driving wheels for rotating the latter in one direction, a pair of foot operated pedals pivotally supported by said platform, and an adjustable connection between the pedals and levers.

2. A pedal operated vehicle including a platform, a steering wheel supporting the forward end of said platform, driving wheels supporting the rear end of said platform, a pivoted lever, a gear segment carried by the lever, means connecting said gear segment with said driving wheels for actuating the latter, a pivoted pedal, and adjustable connections between said lever and said pedal.

3. A pedal operated vehicle including a platform, a steering wheel supporting the forward end of said platform, driving wheels supporting the rear end of said platform, a cross bar connected adjacent the forward end of said platform, a pair of pedals pivotally secured to said cross bar, a pair of pivoted levers, means connecting said levers with said driving wheels for operating the latter in one direction, and adjustable connections between said levers and said pedals.

4. A pedal operated vehicle comprising a platform, a steering wheel supporting the forward end of said platform, driving wheels supporting the rear end of said platform, a pair of pedals pivotally secured to said platform, means normally retaining said pedals in elevated position, a pair of pivoted levers, means connecting said levers with said driving wheels for actuating the latter, sleeves adjustably fitted upon said levers, means for securing said sleeves in adjusted position, and pins projecting from said sleeves and integral therewith and slidably engaged with said pedals.

5. A pedal operated vehicle including a platform, a steering wheel supporting the forward end of said platform, driving wheels supporting the rear end of said platform, a pair of pivoted pedals having slotted rear terminals, a pair of levers pivotally secured to said platform, means connecting said levers with said driving wheels for actuating the latter, sleeves adjustable longitudinally of said levers, means for securing said sleeves in adjusted position, and pins projecting from said sleeves and integral therewith and slidably engaged in the slots in said pedals.

In testimony whereof I affix my signature in presence of two witnesses.

CLIFFORD A. IMLAY.

Witnesses:
A. KOCH,
E. S. FYFE.